Aug. 10, 1948.    H. J. KINGSBURY    2,446,597
WORKTABLE FOR BELT GRINDERS OR THE LIKE
Filed Nov. 15, 1946    5 Sheets-Sheet 1

INVENTOR.
Henry J. Kingsbury
BY
Otto A. Earl
Attorney.

Aug. 10, 1948. H. J. KINGSBURY 2,446,597
WORKTABLE FOR BELT GRINDERS OR THE LIKE
Filed Nov. 15, 1946 5 Sheets-Sheet 2
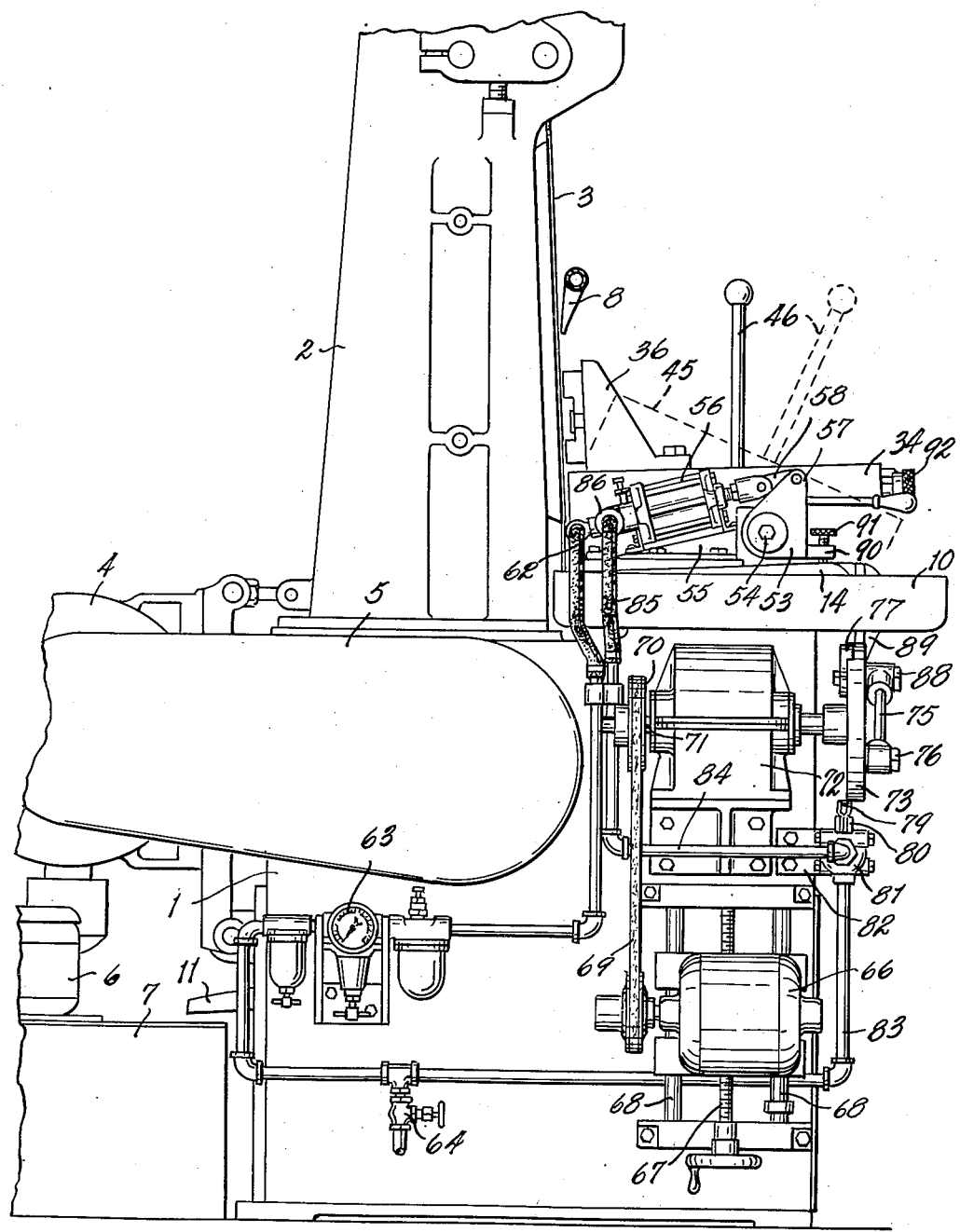
FIG. 2
INVENTOR.
Henry J. Kingsbury
BY
Attorney.

Aug. 10, 1948.　　　H. J. KINGSBURY　　　2,446,597
WORKTABLE FOR BELT GRINDERS OR THE LIKE
Filed Nov. 15, 1946　　　　　　　　　　　5 Sheets-Sheet 3
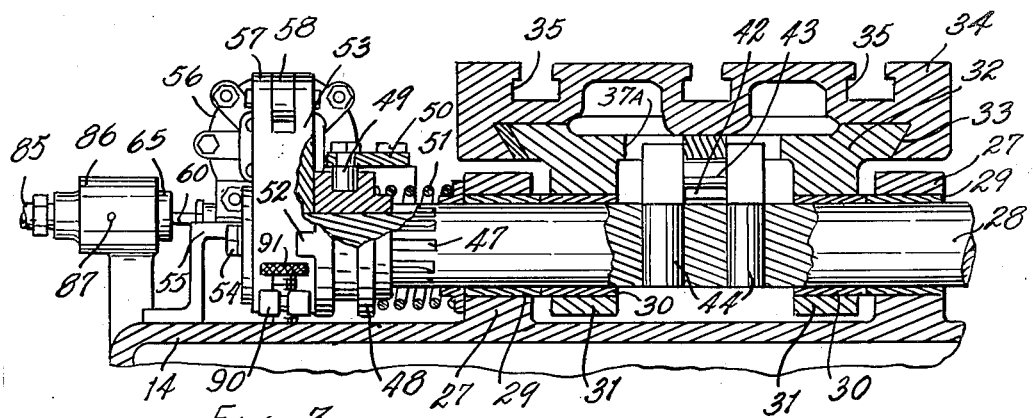
FIG. 3
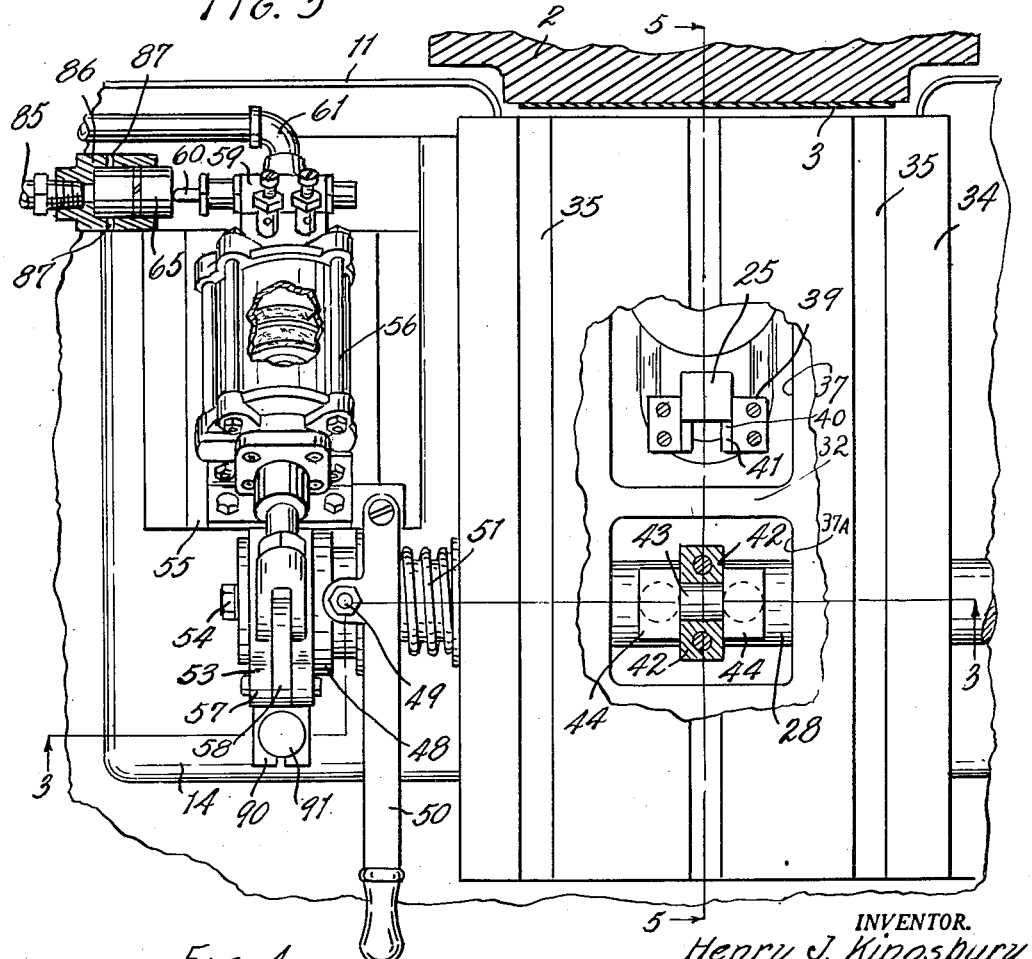
FIG. 4
INVENTOR.
Henry J. Kingsbury
BY
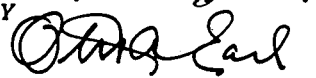
Attorney.

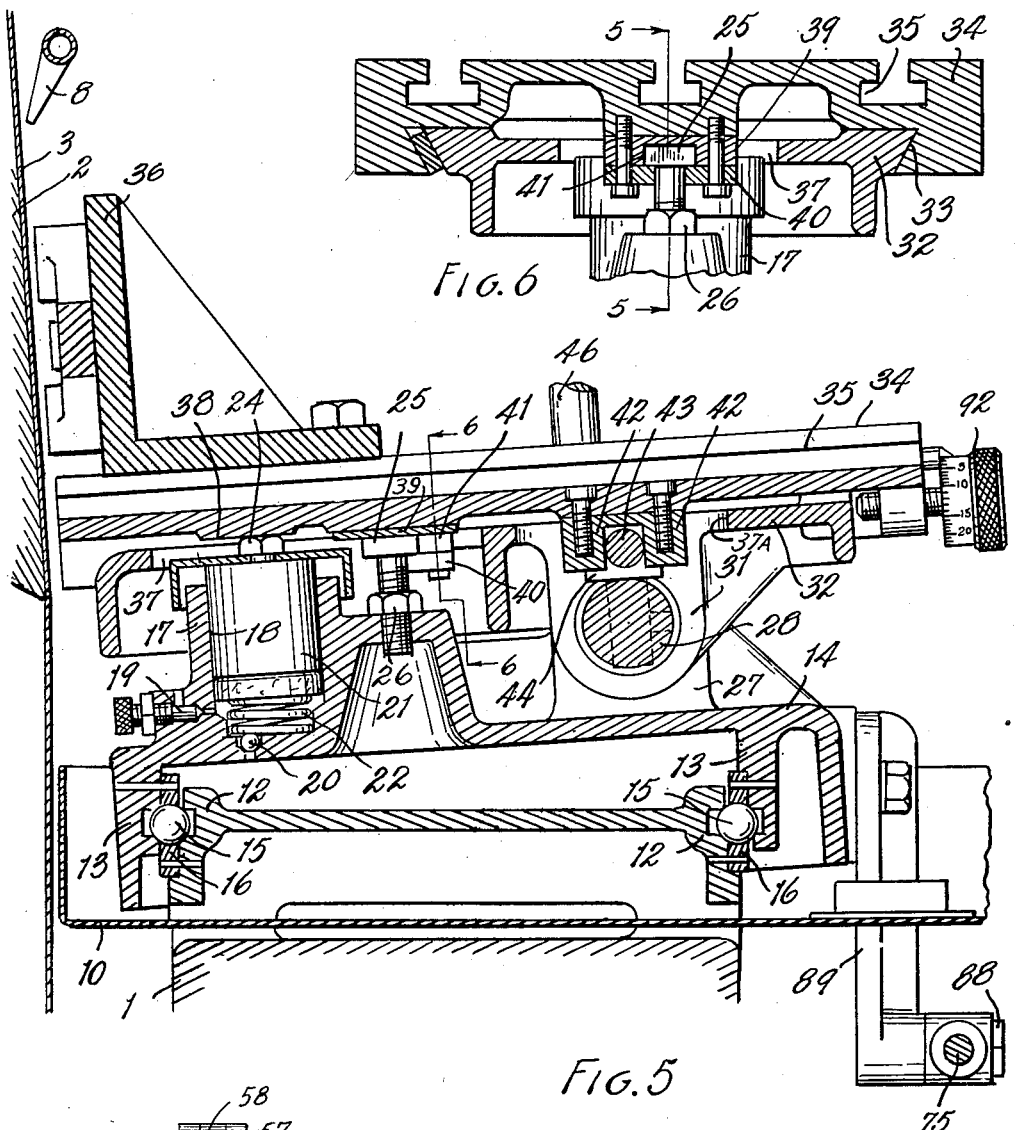

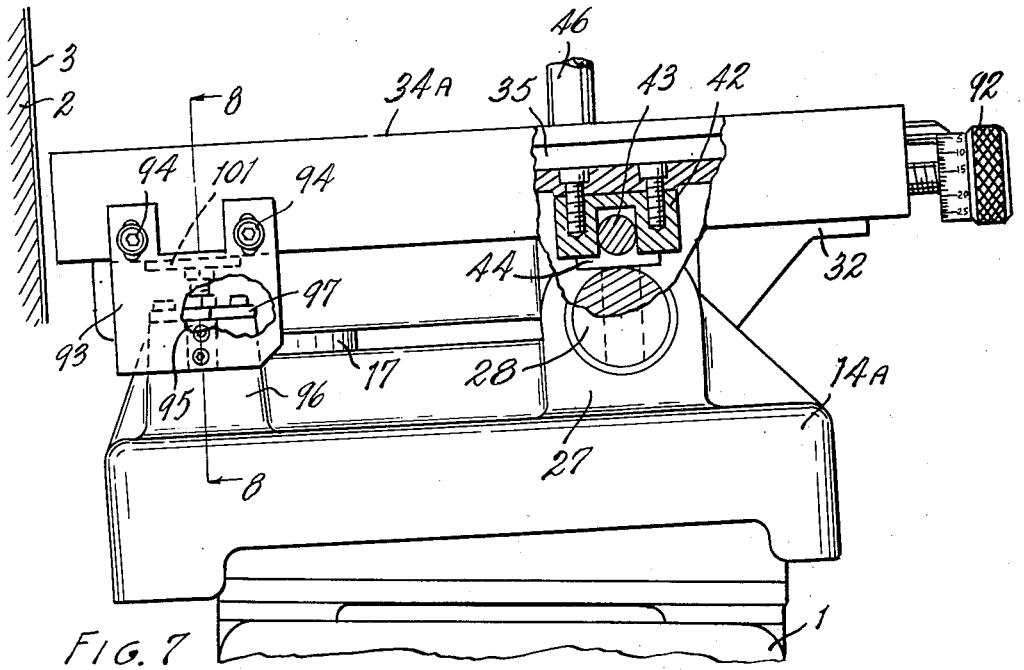
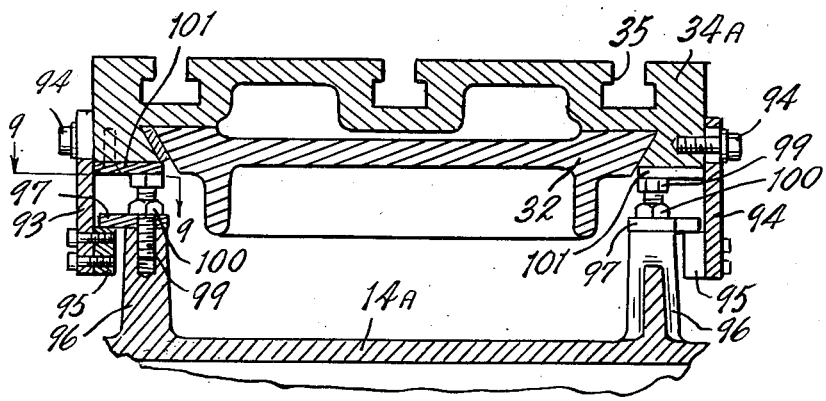
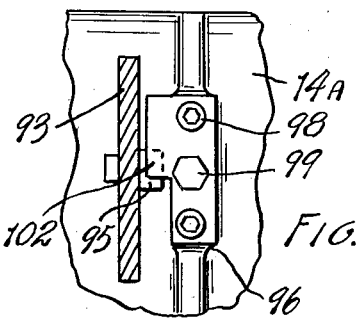

Patented Aug. 10, 1948

2,446,597

UNITED STATES PATENT OFFICE 2,446,597

WORKTABLE FOR BELT GRINDERS OR THE LIKE

Henry J. Kingsbury, Kalamazoo, Mich., assignor to Hammond Machinery Builders, Inc., Kalamazoo, Mich.

Application November 15, 1946, Serial No. 710,194

25 Claims. (Cl. 51—143)

1

This invention relates to improvements in a work table for a belt grinder or the like.

The principal objects of this invention are:

First, to provide an automatic actuating mechanism for the work table of a belt grinder which will reciprocate the work table and the work piece carried thereby transversely across a grinding belt.

Second, to provide automatic actuating mechanism for the work table of a belt grinder which will reciprocate the work table and the work piece carried thereby longitudinally toward and away from the grinding belt.

Third, to provide oscillating mechanism for periodically moving the work table of a belt grinding machine into and out of grinding position while at the same time permitting the work table to be manually tilted away from the belt for the installation of a new work piece.

Fourth, to provide interconnected transverse and longitudinal oscillating means for the work table of a belt grinder which permits the table to be tilted to install the work piece thereon and which permits the work table to be reciprocated into and out of work engaging position by automatic means which are easily disengageable during the tilting of the work table.

Fifth, to provide power driven mechanism for operating and controlling the operation of the work table of a belt grinding machine which permits the grinder to be operated entirely automatically after a work piece has been installed thereon.

Sixth, to provide mechanism for actuating the work table of a belt grinder which intermittently retracts the work piece from the belt permitting the free flow of a grinding coolant along the belt.

Seventh, to provide disengageable locking means for locking a tiltable work table in working position which permit longitudinal oscillation of the table and still hold the table in rigid level position.

Other objects and advantages pertaining to the details and economies of the invention will be apparent from the description to follow. The invention is further pointed out in the claims.

The drawings, of which there are five sheets, illustrate a preferred form and one modified form of my grinder.

Fig. 2 is a side elevational view partially broken away of the grinder.

2

Figure 1:
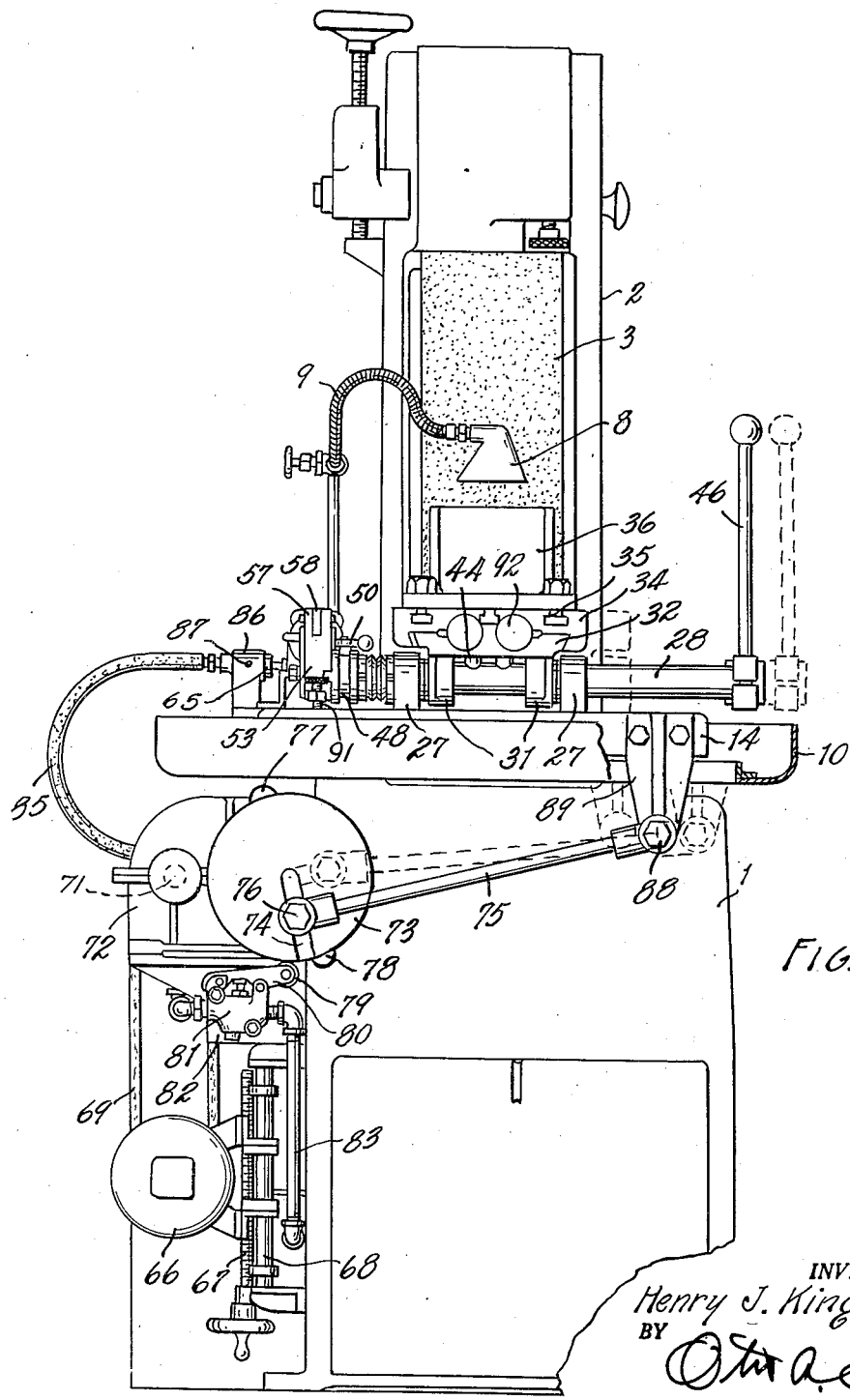
Fig. 1 is a front elevational view partially broken away of my grinder.

Fig. 3 is a fragmentary cross sectional view along the broken line 3—3 in Fig. 4.

Fig. 4 is a fragmentary plan view partially broken away in cross section of my work table and the actuating mechanism therefor.

Fig. 5 is a fragmentary cross sectional view along the line 5—5 in Figs. 4 and 6.

Fig. 6 is a fragmentary cross sectional view along the broken line 6—6 in Fig. 5.

Fig. 7 is a fragmentary side elevational view partially in vertical cross section illustrating a modified form of work table support and lock for my grinder.

Fig. 8 is a fragmentary cross sectional view along the line 8—8 in Fig. 7.

Fig. 9 is a fragmentary cross sectional view along the line 9—9 in Fig. 8.

Fig. 10 is an enlarged detailed cross sectional view showing the mounting of the oscillating lever and clutch member on the rock shaft which reciprocates the work table.

Reference is made to the belt grinder and work table therefor disclosed and claimed in the co-pending application of Donald E. Sutton for Worktables for belt grinders and the like, Serial No. 660,352, filed April 8, 1946, which shows a work table for which my automatic actuating mechanism is designed.

My grinder comprises a pedestal 1 having an upright 2 for supporting the upper pulley, not shown, for the abrasive belt 3. The driving mechanism for the belt consists of a motor 4 and suitable belts and pulleys enclosed in the base of the pedestal 1 and the cover member 5. A motor 6 drives a coolant pump which is located in the coolant tank 7 for circulating cutting coolant from the tank 7 to a nozzle 8 positioned in front of the belt 3 and supported on a bendable tube 9. Coolant from the nozzle 8 is collected in a tray 10 and conducted through suitable pipes, not shown, to the spout 11 at the rear of the grinder where it is discharged into the coolant tank 7. The details of the belt driving and coolant circulating mechanisms are of standard design and form no part of this invention and so are not shown in greater detail.

As in the above mentioned disclosure of Sutton, the pedestal is provided with parallel ways 12 (see Fig. 5) extending transversely of the belt 3 and cooperative with ways 13 on the underside of a carriage 14 to slidably mount the carriage on the pedestal. Ball bearings 15 retained in cages 16 are positioned between the ways 12 and 13 to freely mount the carriage on the pedestal.

The upper surface of the carriage 14 has a boss 17 formed thereon which defines an upwardly opening cylinder 18 communicating at its lower end with an adjustable bleed valve 19 and a one-way ball closed check valve 20. The cylinder 18 is arranged to slidably receive a dash pot piston 21 which is biased upwardly by the coiled spring 22 and carries a stop nut 24 on its upper end for cushioning the downward movement of the work table as will be explained more particularly later. The boss 17 also carries a square headed lock bolt 25 which is vertically adjustable by manipulation of the lock nut 26. The function of the lock bolt will appear presently.

Formed on the upper surface of the carriage 14 on the forward edge thereof are the spaced parallel ears 27 which form journals for a rock shaft 28 extending parallel to the face of the abrasive belt 3. Bushings 29 (see Fig. 3) are positioned around the shaft and within the journals in the ears 27. Other bushings 30 positioned around the shaft 28 between the ears 27 rotatably support and frictionally engage the ears 31 with the shaft 28. The ears 31 depend from the lower side of the work table bed plate 32 which is rotatable and tiltably supported on the rock shaft thereby. The upper surface of the bed plate 32 is provided with beveled ways 33 engageable with a dove-tailed slot in the underside of the work table 34. The work table is thus slidable toward and away from the belt 3 along the bed plate 32. The upper surface of the work table is provided with the T slots 35 by means of which a work piece such as is shown at 36 may be secured to the work table.

The underside of the work table is open to the carriage through a slot 37 in the center of the bed plate and is provided with a bumper surface 38 engageable with the bolt 24 on the dash pot to cushion the downward movement of the work table and bed plate as they tilt about the rock shaft 28. Just forwardly of the stop surface 38 there is provided a yoke member 39 secured to the underside of the work table by suitable metal screws which also secure retainer plates 40 to the yoke to define a T shaped slot 41 engageable with the head of the lock bolt 25. The length and position of the T-shaped slot 41 is proportioned relative to the lock bolt 25 so that the engagement therebetween prevents the tilting of the work table and bed plate except when the work table is slid forwardly or to the right as shown in Fig. 5 on the bed plate till the lock bolt 25 clears the slot 41.

Secured to the underside of the bed plate 32 forwardly of the yoke 39 are a pair of longitudinally spaced stops 42 engageable with the cross pin 43 of a yoke 44 mounted on the shaft 28. The stops 42 project downwardly through an opening 37A in the bed plate 32 (see Figs. 3 and 4). It will thus be seen that oscillation of the shaft 28 will impart reciprocatory motion to the work table 34 due to engagement of the yoke pin 43 with the stops 42. Engagement of the lock bolt 25 with the T slot 41 prevents frictional engagement between the bushings 30, ears 31 and shaft 28 from tilting the bed plate and work table until the work table has been reciprocated far enough to clear the retainer plates 40 from the head of the bolt 25. Further rotation of the shaft will then tilt the bed plate and work table into the position shown by the dotted lines at 45 in Fig. 2.

One end of the rock shaft 28 is provided with a manually operable handle 46 and the other end is splined as at 47 (see Fig. 3) to receive a clutch member 48 which is rotatable with the shaft but movable axially therealong under the influence of a clutch pin 49 carried on the manually operable lever 50. A coil spring 51 urges the clutch member to the left as shown in Figs. 3 and 4. The clutch 48 is provided with a projecting dog 52 which is engageable with a mating slot in the lever 53. The lever is rotatably retained on the reduced unsplined portion of shaft 28 by means of a washer and bolt as at 54 (see Fig. 10). The shaft is thus arranged to be rotated or oscillated by either the manual lever 46 or the lever 53.

Secured to the top of the carriage and toward the rear of the rock shaft 28 is a wedge shaped block 55 which supports an air cylinder 56 on the carriage. The air cylinder 56 is provided with a piston rod connected to the arm 57 of the lever 53 by means of a link 58. The air cylinder 56 is further provided with a two-way spring pressed valve 59 which is arranged to admit compressed air into either end of the cylinder depending upon the location of the plunger 60. Air is supplied to the valve 59 (see Fig. 4) through a compressed air pipe 61 and flexible hose 62 from the gage 63 and valve 64. (See Fig. 2.) The valve 59 is spring pressed to supply air to the front end of the cylinder 56 to apply a counterclockwise rotation to the lever 57 as viewed in Fig. 2 and urge the work piece against the belt until the valve and plunger 60 are actuated by the piston 65 as will be described presently.

The mechanism for reciprocating the carriage and actuating the piston 65 is mounted on the side of the pedestal as is most clearly illustrated in Figs. 1 and 2. An electric motor 66 is adjustably mounted on an elevating screw 67 and slidable along the guide rods 68 which are secured to the side of the pedestal by a suitable bracket. The motor is connected by means of the V belt 69 to a pulley 70 on the drive shaft 71. The drive shaft is journaled in a speed reducer 72 mounted on the side of the pedestal and carries a crank shaft with a crank wheel 73 on its forward end. The crank wheel is provided with a radial slot 74 in which the end of the connecting rod 75 is adjustably and pivotally mounted by means of the crank pin 76. The crank wheel is provided with a pair of cams 77 and 78 which are positioned generally at opposite ends of the diameter of the crank wheel including the T slot 74. The cams project beyond the edge of the wheel and are arranged to engage the roller 79 on the valve lever arm 80 twice during each revolution of the crank wheel at each end of the throw of the connecting rod 75.

The valve lever arm 80 is arranged to actuate and open a spring pressed valve 81 secured to the pedestal by a bracket 82. The valve is connected to the air supply valve 64 by a pipe 83 and arranged to deliver compressed air when open through the pipe 84 and flexible tube 85 to the valve 86 mounted on the carriage and in which the piston 65 previously mentioned is mounted. The valve 86 is provided with exhaust ports 87 (see Fig. 4) to automatically relieve the pressure behind the piston 65 after the piston has been moved outwardly to actuate the plunger 60 and valve 59 on the air cylinder 56.

It will thus be seen that with each revolution of the crank wheel 73, valves 81 and 86 and 59 will be actuated twice to cut off the supply of compressed air to the front side of the air cylinder 56 for a short period of time and apply air pressure to the back of the cylinder. This causes the air cylinder to rotate the crank lever 57 forwardly or to the right as shown in Fig. 2 to rotate the rock shaft 28 and retract the bed plate, work table and work piece away from engagement with the grinding belt 3 permitting the free flow of cutting coolant from the nozzle 8 along the face of the grinding belt. This carries away particles of metal which may have accumulated between the belt and work piece and assures adequate cooling of the belt and prevents the edge of the work piece from acting as a wiping edge to continuously prevent coolant from reaching the surface of the belt which is in engagement with the work piece. This retraction of the work piece will be of short duration because the cams 77 and 78 on the crank wheel will rapidly release the valve lever 80 and cut off the supply of compressed air to the valve 86 permitting the spring in valve 59 on the air cylinder to reopen the supply of air to the front of the air cylinder 56 and engage the work piece with the grinding belt.

The connecting rod 75 is pivotally connected at its right end to a pin 88 mounted on a bracket 89 which is secured to the forward edge of the carriage 14. Thus oscillation of the connecting rod by the crank wheel 73 causes the carriage to be reciprocated on the ways 12 and 13 transversely across the grinding belt 3. The amplitude of reciprocation of the carriage may be adjusted by changing the position of the crank pin 76 in the slot 74 to vary the throw of the pin. When grinding a narrow piece the crank pin will be adjusted for a minimum throw to prevent the work piece from engaging only one side of the grinding belt during the end portions of its reciprocatory motion which would apply an uneven drag on the belt 3. With wider work pieces the crank pin will obviously be set for maximum throw to cause the carriage and work piece to have a long travel across the belt 3.

In order to limit the forward motion of the work table away from the grinding belt 3 the crank lever 57 on the rock shaft 28 is provided with an arm 90 and knurled thumb screw 91 which is engageable with the surface of the carriage to adjustably limit the forward rotation of the lever and rock shaft. The rearward travel of the work table on the bed plate toward working engagement with the belt 3 is controlled by engagement of the calibrated and knurled thumb screw 92 carried on the work table with the front edge of the bed plate as is shown in Fig. 5. The grinding machine may thus be adjusted to automatically reciprocate the work piece across the grinding belt 3 and to intermittently retract the work piece to permit effective cooling of the grinding belt and to automatically limit the feed of the work piece to the grinding belt at a predetermined closely adjustable limit. Operation of the grinding machine is thus fully automatic after the work piece has been secured to the work table and the proper adjustments made. The machine will efficiently use the entire surface of the grinding belt 3 and effectively cool the belt for maximum cutting speeds and minimum of wear on the belt.

The clutch 48—52 permits disengagement of the rock shaft 28 from the power actuating cylinder 56 and stop screw 91 so that the manual lever 46 may be used to rotate the shaft far enough to disengage the head of the lock bolt 25 from the T slot 41. The lever 46 may then be rotated further to tilt the bed plate and work table upwardly due to the frictional engagement between the ears 31, bushings 30 and shaft 28 as previously described. The tilting feature of the work table makes it easy to install the work pieces on the work table and the entire grinding machine may be efficiently operated by relatively inexperienced operators.

The modified form of my grinder illustrated in Figs. 7, 8 and 9 operates in the same manner as the preferred form but is provided with a modified carriage 14A and work table 34A. The lock bolt 25 and T slot 41 in the center of the work table of the preferred form are omitted and in their place the sides of the work table 34A are provided with side plates 93 secured thereto near its rear edge by machine screws 94 extending through vertical slots in the plates 93. The lower edges of the side plates depend below the sides of the bed plate 32 and have locking bars 95 secured to the inner edges thereof.

The carriage 14A is provided with upstanding bosses 96 on its top surface opposite the locking bars 95. Each boss 96 has a locking plate 97 secured to the top thereof by machine screws 98. A stop screw 99 provided with a lock nut 100 extends upwardly above each lock plate. The heads of the stop screws engage and slide upon hardened wear plates 101 secured to the underside of the work table 34A and are adjustable in height by manipulation of the lock nuts 100.

The locking plates 97 are provided with extensions 102 which lap over and hold down the locking bars 95. The length of the projections 102 and locking bars 95 are proportioned to hold down the work table and bed plate during the limited reciprocatory motion of the bed plate but to be disengaged to permit tilting of the work table and bed plate when the rock shaft 28 is manually rotated beyond the limits of the automatic reciprocating mechanism in the same manner as in the preferred form of the grinder.

The mechanism for reciprocating the work table including the rock shaft 28, cross pin 43, stops 42 and manual lever 46 is the same as in the preferred form of grinder. The side plates 93 are vertically adjustable by positioning the screws 94 in the slots in the side plates to accommodate adjustments of the stop screws 99. The stop screws 99 serve to more rigidly support the rear working edge of the work table in fixed relationship with respect to the belt 3 than the single lock nut 25 in the preferred form of the grinder. In grinders where accuracy of work is of greater importance than cost, the modified form of grinder may be more desired than the preferred form described herein.

I have thus described my invention in two highly practical commercial embodiments thereof so that others may reproduce the same with such minor modifications as may be desired without further description.

Having thus described my invention, what I claim as new and desire to secure by Letters Patent, is:

1. Actuating mechanism for the work table of a belt grinder or the like having a transversely reciprocable carriage and a longitudinally reciprocable work table comprising, a rock shaft journaled on said carriage and parallel to the surface of the belt, a bed plate having ears on the underside thereof journaled on said rock shaft and frictionally engageable therewith, a manually operable lever secured to said shaft, a work table slidable on said bed plate longitudinally of said grinder, a stop member secured to said carriage and slidably engageable with said work table to prevent rotation of said table and bed plate with said shaft, a yoke secured to said shaft and extending from one side thereof, a pair of stops on the underside of said work table and engaged with opposite sides of said yoke, a crank lever rotatably mounted on the other end of said rock shaft from said manual lever, a clutch member manually slidable on said rock shaft and arranged to engage said shaft and crank lever, said clutch member being spring pressed toward engaging position, a pneumatic cylinder secured to said carriage, a piston in said cylinder having a piston rod link connected to said crank lever to impart oscillating motion to said shaft, a first valve associated with said cylinder and arranged to supply compressed air to either end of said cylinder, said valve being spring pressed to supply air to one end of said cylinder to move said shaft and work table toward work engaging position, said valve having a plunger on the outside thereof adapted to change the position of said valve, a first conduit for supplying air to said first valve, a second conduit having a piston valve on the end thereof and arranged to actuate said plunger, said second valve defining an exhaust port arranged to be open at the end of the movement of said piston, a third valve in said second conduit and spring pressed to closed position, a crank wheel on said grinder, a connecting rod adjustably secured to said crank wheel for variable throw and arranged to reciprocate said carriage, a cam on said crank wheel arranged to open said third valve once in each revolution of said crank wheel, and a motor on said grinder arranged to drive said crank wheel.

2. Actuating mechanism for the work table of a belt grinder or the like having a transversely reciprocable carriage and a longitudinally reciprocable work table comprising, a rock shaft journaled on said carriage and parallel to the belt of said grinder, a bed plate having ears on the underside thereof journaled on said rock shaft, a manually operable lever secured to said shaft, a work table slidable on said bed plate longitudinally of said grinder, a pin secured to said shaft and extending from one side thereof, a pair of stops on the underside of said work table and engaged with opposite sides of said pin, a crank lever rotatably mounted on the other end of said rock shaft from said manual lever, a clutch member manually slidable on said rock shaft and arranged to engage said shaft and crank lever, said clutch member being spring pressed toward engaging position, a pneumatic cylinder secured to said carriage, a piston in said cylinder having a piston rod link connected to said crank lever to impart oscillating motion to said shaft, a first valve associated with said cylinder and arranged to supply compressed air to either end of said cylinder, said valve being spring pressed to supply air to one end of said cylinder to move said shaft and table toward work engaging position, a first conduit for supplying air to said first valve, a second conduit having a piston valve on the end thereof and arranged to move said first valve to its alternate position to retract said work table, said second valve defining an exhaust port arranged to be open at the end of the outward movement of said piston, a third valve in said second conduit and spring pressed to closed position, a crank wheel on said grinder, a connecting rod adjustably secured to said crank wheel for variable throw and arranged to reciprocate said carriage, a pair of cams on said crank wheel arranged to momentarily open said third valve twice in each revolution of said crank wheel, and a motor on said grinder arranged to drive said crank wheel.

3. Actuating mechanism for the work table of a grinder or the like having a transversely reciprocable carriage and a longitudinally reciprocable work table comprising, a rock shaft journaled on said carriage, a bed plate having ears on the underside thereof journaled on said rock shaft, a work table slidable on said bed plate longitudinally of said grinder, an arm secured to said shaft and extending from one side thereof, a pair of stops on the underside of said work table and engaged with opposite sides of said arm, a crank lever rotatably mounted on said rock shaft, a clutch member manually slidable on said rock shaft and arranged to engage said shaft and crank lever, a pneumatic cylinder secured to said carriage, a piston in said cylinder having a piston rod connected to said crank lever to impart oscillating motion to said shaft, a first valve associated with said cylinder and arranged to supply compressed air to either end of said cylinder, said valve being spring pressed to supply air to one end of said cylinder to move said shaft and work table toward work engaging position, a first conduit for supplying air to said first valve, a second conduit having a piston valve on the end thereof and arranged to move said first valve to its alternate position, a third valve in said second conduit, a crank on said grinder, a connecting rod secured to said crank and arranged to reciprocate said carriage, a cam on said crank arranged to open said third valve once in each revolution of said crank, and a motor on said grinder arranged to drive said crank.

4. Actuating mechanism for the work table of a belt grinder having a transversely reciprocable carriage and a longitudinally reciprocable work table comprising, a rock shaft journaled on said carriage, a bed plate rotatably supported on said rock shaft and in frictional engagement therewith, said work table being slidable on said bed plate, a lock member secured to said carriage and slidably engaged with said work table to resist the frictional force of said shaft tending to rotate said bed plate, a yoke carried on said rock shaft and engaged with stops on said work table for reciprocating said work table upon oscillation of said rock shaft, a crank lever rotatably mounted on the end of said rock shaft, a manually operable clutch arranged to connect said crank lever to said rock shaft, an air cylinder on said carriage having its piston connected to said crank lever to impart rotary motion to said shaft, a first air valve associated with said air cylinder and arranged to supply air to one end thereof to urge said work table into work engaging position, a first air conduit for supplying compressed air to said first valve, a second air conduit having a piston therein arranged to reverse the position of said first valve to supply air to the other end of said air cylinder, a second valve in said second air conduit spring pressed to closed position, a crank wheel arranged to reciprocate said carriage, said crank wheel having a pair of cams thereon arranged to actuate said second valve during portions of each revolution of said crank wheel, a stop on said crank lever adjustably engageable with said carriage to limit the retracted position of said work table, another stop on said work table adjustably engageable with said bed plate to limit the work engaging motion of said work table, and a motor arranged to drive said crank wheel.

5. Actuating mechanism for the work table of a belt grinder having a transversely reciprocable carriage and a longitudinally reciprocable work table comprising, a rock shaft journaled on said carriage, a bed plate supported on said rock shaft and in frictional engagement therewith, said work table being slidable on said bed plate, a pin secured to said carriage and slidably engaged with said work table to resist the frictional force of said shaft from rotating said bed plate, a yoke carried on said rock shaft and engaged with said work table for reciprocating said work table upon oscillation of said rock shaft, a crank lever rotatably mounted on one end of said rock shaft, a manual lever secured to the other end of said rock shaft, a dog clutch arranged to connect said crank lever to said rock shaft, an air cylinder having its piston connected to said crank lever, a first air valve associated with said air cylinder and spring pressed to supply air to one end thereof to urge said work table into work engaging position, a first air conduit arranged to supply compressed air to said first valve, a second air conduit having a piston therein arranged to actuate said first valve to supply air to the opposite end of said air cylinder, a second valve in said second air conduit spring pressed to closed position, a crank wheel arranged to reciprocate said carriage, said crank wheel having cams thereon arranged to actuate said second valve twice in each revolution of said crank wheel, and a motor arranged to drive said crank wheel.

6. Actuating mechanism for the work table of a belt grinder having a transversely reciprocable cariage and a longitudinally reciprocable work table comprising a rock shaft journaled on said carriage, a bed plate supported on said rock shaft, said work table being slidable on said bed plate, an arm carried on said rock shaft and between a pair of stops on said work table for reciprocating said work table upon oscillation of said rock shaft, a crank lever rotatably mounted on the end of said rock shaft, a clutch arranged to connect said crank lever to said rock shaft, said clutch being spring pressed to connected position, an air cylinder having its piston connected to said crank lever, a first air valve associated with said air cylinder and arranged to supply air to one end thereof to urge said work table into work engaging position, a first air conduit for supplying compressed air to said first valve, a second air conduit having a piston therein arranged to reverse the position of said first valve and the supply of air to said air cylinder, said second conduit defining a vent opened by said piston at the end of its outward movement, a second valve in said second air conduit, a crank member arranged to reciprocate said carriage, said crank having a cam thereon arranged to actuate said second valve once in each revolution of said crank wheel, and a motor arranged to drive said crank wheel.

7. In combination with a belt grinder or the like having a transversely reciprocable carriage and a longitudinally reciprocable work table mounted on said carriage, a rock shaft journaled on said carriage, a yoke secured to said shaft, stop members on said work table and engaged on opposite sides of said yoke, a crank lever rotatably mounted on said shaft, a manually operable clutch arranged to engage said lever with said shaft, a pneumatic cylinder mounted on said carriage and having a piston engaged with said lever for oscillating said shaft, a conduit including a flexible portion for supplying air to said cylinder, a valve between said cylinder and conduit arranged to direct the air to either end of said cylinder, said valve being spring pressed to direct air to one end of said cylinder to urge said piston and lever to work engaging position, a rotary member connected to reciprocate said carriage, and pneumatic means actuated by said rotary member to periodically reverse the position of said valve.

8. In combination with a grinder having a transversely reciprocable carriage and a longitudinally reciprocable work table mounted on said carriage, a rock shaft journaled on said carriage, a yoke secured to said shaft, stop members on said work table and engaged on opposite sides of said yoke, a crank lever rotatable with said shaft, a pneumatic cylinder mounted on said carriage and having a piston engaged with said lever for oscillating said shaft, a conduit including a flexible portion for supplying air to said cylinder, a valve between said cylinder and conduit arranged to direct the air to either end of said cylinder, said valve being spring pressed to direct air to one end of said cylinder to urge said piston and lever to work engaging position, and pneumatic means including a valve actuated in timed relationship with the carriage for reversing the position of said valve when said carriage is at the ends of its reciprocatory motion.

9. In combination with a grinder having a transversely reciprocable carriage and a longitudinally reciprocable work table mounted on said carriage, a rock shaft journaled on said carriage, an arm projecting from said shaft, stop members on said work table and engaged on opposite sides of said arm, a crank lever rotatable with said shaft, a pneumatic cylinder mounted on said carriage and having a piston engaged with said lever for oscillating said shaft, a conduit for supplying air to said cylinder, a valve in said conduit arranged to direct the air to either end of said cylinder, said valve being spring pressed to direct air to one end of said cylinder to urge said piston and lever to work engaging position, and means including a valve actuated in timed relationship with the carriage for momentarily reversing the position of said valve when said carriage is at the ends of its reciprocatory travel.

10. In combination with a belt grinder having a generally vertically disposed belt and a pedestal, a rock shaft supported by said pedestal and parallel to the face of said belt, a bed plate having a journaled support on said shaft, a work table slidable on said bed plate normal to said belt and having spaced depending ears extending through said bed plate, a pin secured to said rock shaft and engaged between said ears whereby oscillation of said rock shaft will reciprocate said work table on said bed plate, a pneumatic cylinder supported by said pedestal independently of said bed plate and having a piston therein, a crank lever secured to said rock shaft and link connected to said piston, a conduit for supplying compressed air to said cylinder, a valve between said conduit and said cylinder arranged to direct the air to either end of said cylinder, said valve being spring pressed to direct air to said cylinder to actuate said cylinder and crank lever toward work engaging position, a control member on said valve for reversing the position thereof, and a manually adjustable stop member on said crank lever to limit the oscillation of said crank lever and shaft toward work disengaging position.

11. In combination with a belt grinder having a generally vertically disposed belt and a pedestal, a rock shaft supported by said pedestal, a bed plate supported on said pedestal, a work table slidable on said bed plate normal to said belt and having spaced depending ears, a pin secured to said rock shaft and engaged between said ears whereby oscillation of said rock shaft will reciprocate said work table on said bed plate, a pneumatic cylinder supported by said pedestal and having a piston therein, a crank lever secured to said rock shaft and connected to said piston, a conduit for supplying compressed air to said cylinder, a valve in said conduit and arranged to direct the air to either end of said cylinder, said valve being spring pressed to direct air to said cylinder to actuate said cylinder and crank lever toward work engaging position, and a control member on said valve for reversing the position thereof.

12. In combination with a belt grinder having a generally vertically disposed belt and a pedestal, a rock shaft supported by said pedestal, a work table slidable normal to said belt and having spaced ears, a pin secured to said rock shaft and engaged between said ears whereby oscillation of said rock shaft will reciprocate said work table on said pedestal, a pneumatic cylinder supported by said pedestal and having a piston therein, a crank lever secured to said rock shaft and connected to said piston, a conduit for supplying compressed air to said cylinder, a valve in said conduit and arranged to direct the air to either end of said cylinder, said valve being spring pressed to direct air to said cylinder to actuate said cylinder and crank lever toward work engaging position, and a control member on said valve for reversing the position thereof.

13. In combination with a belt grinder having a belt, a rock shaft supported parallel to the face of said belt, a bed plate, a work table slidable on said bed plate toward and away from said belt, an arm secured to said rock shaft and engaged with said work table whereby oscillation of said rock shaft will reciprocate said work table on said bed plate, a pneumatic cylinder having a piston therein, a crank lever secured to said rock shaft and connected to said piston, a conduit for supplying compressed air to said cylinder, a valve in said conduit and arranged to direct the air to either end of said cylinder, said valve being spring pressed to direct air to said cylinder to actuate said cylinder and crank lever toward work engaging position, and a control member on said valve for reversing the position thereof.

14. In combination with a belt grinder having a reciprocable work table, a rock shaft, a bed plate having an ear journaled on said rock shaft and frictionally engaged therewith, said table being slidable on said bed plate, an arm extending radially from said shaft, stops on said table positioned on each side of said arm to translate oscillating motion of said shaft to reciprocating motion of said table, a crank arm rotatably mounted on said shaft, a manually operable clutch for connecting said crank arm to said shaft, an air cylinder having a piston connected to said crank arm to impart oscillating motion to said shaft, a lock member slidably engaged with said work table to prevent rotation of said table and bed plate with said shaft within the limits of oscillation of said piston, a manual lever secured to said shaft arranged to rotate said shaft beyond the limits of movement of said piston to tilt said bed plate and work table when said clutch is disconnected, and an adjustable stop on said crank arm for limiting the oscillation of said shaft by said piston.

15. In combination with a belt grinder having a reciprocable work table, a rock shaft, a bed plate having an ear journaled on said rock shaft and frictionally engaged therewith, said table being slidable on said bed plate, an arm extending radially from said shaft, stops on said table positioned on each side of said arm to translate oscillating motion of said shaft to reciprocating motion of said table, a crank arm rotatably mounted on said shaft, a manually operable clutch for connecting said crank arm to said shaft, an air cylinder having a piston connected to said crank arm to impart oscillating motion to said shaft, a fixed member slidably engaged with said work table to prevent rotation of said table and bed plate with said shaft within the limits of oscillation of said piston, and a manual lever secured to said shaft arranged to rotate said shaft beyond the limits of movement of said piston to tilt said bed plate and work table.

16. In combination with a belt grinder having a reciprocable work table, a rock shaft, a bed plate having an ear journaled on said rock shaft and frictionally engaged therewith, said table being slidable on said bed plate, an arm extending radially from said shaft, stops on said table positioned on each side of said arm to translate oscillating motion of said shaft to reciprocating motion of said table, a crank arm rotatably mounted on said shaft, a manually operable clutch for connecting said crank arm to said shaft, an air cylinder having a piston connected to said crank arm to impart oscillating motion to said shaft, a fixed member slidably engaged with said work table to prevent rotation of said table and bed plate with said shaft within the limits of oscillation of said piston, a manual lever secured to said shaft arranged to rotate said shaft beyond the limits of movement of said piston to tilt said bed plate and work table when said clutch is disconnected, and an air conduit and valve for supplying compressed air to said cylinder to force said table into work engaging position and periodically retract said table.

17. In combination with a belt grinder having a reciprocable work table, a rock shaft, a bed plate having an ear journaled on said rock shaft and frictionally engaged therewith, said table being slidable on said bed plate, an arm extending radially from said shaft, stops on said table positioned on each side of said arm to translate oscillating motion of said shaft to reciprocating motion of said table, a crank arm rotatably mounted on said shaft, a manually operable clutch for connecting said crank arm to said shaft, a pneumatically extensible member connected to said crank arm to impart oscillating motion to said shaft, a lock member slidably engaged with said work table to prevent rotation of said table and bed plate with said shaft within the limits of oscillation of said piston, and a manual lever secured to said shaft arranged to rotate said shaft beyond the limits of movement of said piston to tilt said bed plate and work table.

18. In combination with a grinder having a transversely reciprocable carriage and a longitudinally reciprocable work table mounted on said carriage, a rock shaft journaled on said carriage, an arm projecting from said shaft, stop members on said work table and engaged on opposite sides of said arm, a crank lever rotatable with said shaft, a pneumatic cylinder mounted on said carriage and engaged with said lever for oscillating said shaft, a conduit for supplying air to said cylinder, a valve in said conduit arranged to direct the air to either end of said cylinder, said valve being spring pressed to direct air to one end of said cylinder to urge said lever to work engaging position, and means actuated by the carriage reciprocating mechanism for momentarily reversing the position of said valve when said carriage is at the ends of its reciprocatory travel.

19. Actuating mechanism for the work table of a belt grinder or the like having a transversely reciprocable carriage and a longitudinally reciprocable work table comprising a rock shaft journaled on said carriage and parallel to the surface of the belt, a bed plate having ears on the underside thereof journaled on said rock shaft and frictionally engageable therewith, a manually operable lever secured to said shaft, a work table slidable on said bed plate longitudinally of said grinder, lock members secured to the sides of said carriage near the back thereof and slidably engageable with said work table to prevent rotation of said table and bed plate with said shaft, a yoke secured to said shaft and extending from one side thereof, a pair of stops on the underside of said work table and engaged with opposite sides of said yoke, a crank lever rotatably mounted on the other end of said rock shaft from said manual lever, a clutch member manually slidable on said rock shaft and arranged to engage said shaft and crank lever, said clutch member being spring pressed toward engaging position, a pneumatic cylinder secured to said carriage, a piston in said cylinder having a piston rod link connected to said crank lever to impart oscillating motion to said shaft, a first valve associated with said cylinder and arranged to supply compressed air to either end of said cylinder, said valve being spring pressed to supply air to one end of said cylinder to move said shaft and work table toward work engaging position, said valve having a plunger on the outside thereof adapted to change the position of said valve, a first conduit for supplying air to said first valve, a second conduit having a piston valve on the end thereof and arranged to actuate said plunger, said second valve defining an exhaust port arranged to be opened at the end of the movement of said piston, a third valve in said second conduit and spring pressed to closed position, a crank wheel on said grinder, a connecting rod adjustably secured to said crank wheel for variable throw and arranged to reciprocate said carriage, cams on said crank wheel arranged to open said third valve at intervals during each revolution of said crank wheel, and a motor on said grinder arranged to drive said crank wheel.

20. Actuating mechanism for the work table of a belt grinder having a transversely reciprocable carriage and a longitudinally reciprocable work table comprising a rock shaft journaled on said carriage, a bed plate rotatably supported on said rock shaft and in frictional engagement therewith, said work table being slidable on said bed plate, a pair of lock members secured to the sides of said carriage and having locking bars slidably engaged with said work table to resist the frictional force of said shaft tending to rotate said bed plate, a yoke carried on said rock shaft and engaged with stops on said work table for reciprocating said work table upon oscillation of said rock shaft, a crank lever rotatably mounted on the end of said rock shaft, a manually operable clutch arranged to connect said crank lever to said rock shaft, an air cylinder on said carriage having its piston connected to said crank lever to impart rotary motion to said shaft, a first air valve associated with said air cylinder and arranged to supply air to one end thereof to urge said work table into work engaging position, a first air conduit for supplying compressed air to said first valve, a second air conduit having a piston therein arranged to reverse the position of said first valve to supply air to the other end of said air cylinder, a second valve in said second air conduit spring pressed to closed position, a crank wheel arranged to reciprocate said carriage, said crank wheel having a pair of cams thereon arranged to actuate said second valve during portions of each revolution of said crank wheel, a stop on said crank lever adjustably engageable with said carriage to limit the retracted position of said work table, another stop on said work table adjustably engageable with said bed plate to limit the work engaging motion of said work table, and a motor arranged to drive said crank wheel.

21. In combination with a belt grinder having a longitudinally reciprocable work table, a rock shaft, a bed plate having an ear journaled on said rock shaft and frictionally engaged therewith, said table being slidable on said bed plate, an arm extending radially from said shaft, stops on said table positioned on each side of said arm to translate oscillating motion of said shaft to reciprocating motion of said table, a crank arm rotatably mounted on said shaft, a manually operable clutch for connecting said crank arm to said shaft, an air cylinder having a piston connected to said crank arm to impart oscillating motion to said shaft, lock members slidably engaged with said work table near the rear edges thereof to prevent rotation of said table and bed plate with said shaft within the limits of oscillation of said piston, a manual lever secured to said shaft arranged to rotate said shaft beyond the limits of movement of said piston to tilt said bed plate and work table when said clutch is disconnected, and an adjustable stop on said crank arm for limiting the oscillation of said shaft by said piston.

22. In combination with a belt grinder having a longitudinally reciprocable work table, a rock shaft, a bed plate having an ear journaled on said rock shaft and frictionally engaged therewith, said table being slidable on said bed plate, an arm extending radially from said shaft, stops on said table positioned on each side of said arm to translate oscillating motion of said shaft to reciprocating motion of said table, a crank arm rotatably mounted on said shaft, a manually operable clutch for connecting said crank arm to said shaft, a pneumatically extensible member connected to said crank arm to impart oscillating motion to said shaft, a plurality of lock members slidably engaged with said work table to prevent rotation of said table and bed plate with said shaft within the limits of oscillation of said piston, and a manual lever secured to said shaft arranged to rotate said shaft beyond the limits of movement of said piston to tilt said bed plate and work table, said lock members including adjustable stops to limit rotation of said table about said rock shaft.

23. Actuating mechanism for the work table of a belt grinder having a transversely reciprocable carriage and a longitudinally reciprocable work table comprising, a rock shaft journaled on said carriage, a bed plate rotatably supported on said rock shaft and in frictional engagement therewith, said work table being slidable on said bed plate, a pair of plates having locking bars on their lower edges adjustably secured to the sides of said table near the back thereof, a pair of lock members secured to the sides of said carriage and slidably engaged with said locking bars to resist the frictional force of said shaft tending to rotate said bed plate, a pair of supporting screws adjustably connected to said lock members and supporting the rear edge of said table, a yoke carried on said rock shaft and engaged with stops on said work table for reciprocating said work table upon oscillation of said rock shaft, a crank lever rotatably mounted on the end of said rock shaft, a manually operable clutch arranged to connect said crank lever to said rock shaft, an air cylinder on said carriage having its piston connected to said crank lever to impart rotary oscillating motion to said shaft, a first air valve associated with said air cylinder and arranged to supply air to one end thereof to urge said work table into work engaging position, a first air conduit for supplying compressed air to said first valve, a second air conduit having a piston therein arranged to reverse the position of said first valve to supply air to the other end of said air cylinder, a second valve in said second air conduit spring pressed to closed position, a crank wheel arranged to reciprocate said carriage, said crank wheel having a cam thereon arranged to actuate said second valve, a stop on said crank lever adjustably engageable with said carriage to limit the retracted position of said work table, another stop on said work table adjustably engageable with said bed plate to limit the work engaging motion of said work table, and a motor arranged to drive said crank wheel.

24. In combination with a belt grinder having a transversely reciprocable carriage and a longitudinally reciprocable work table, a rock shaft on said carriage, a bed plate having an ear journaled on said rock shaft and frictionally engaged therewith, said table being slidable on said bed plate, an arm extending radially from said shaft, stops on said table positioned on each side of said arm to translate oscillating motion of said shaft to reciprocating motion of said table, a crank arm rotatably mounted on said shaft, a manually operable clutch for connecting said crank arm to said shaft, a pneumatically extensible member connected to said crank arm to impart oscillating motion to said shaft, depending members vertically adjustably secured to the sides of said table near the rear edge thereof and having locking bars on their lower edges, upstanding portions on said carriage having locking members engageable with said locking bars to prevent rotation of said table and bed plate with said shaft within the limits of oscillation of said piston, vertically adjustable stop means secured to said upstanding portions and supporting the rear of said table, and a manual lever secured to said shaft arranged to rotate said shaft beyond the limits of movement of said piston to disengage said locking members and tilt said bed plate and work table.

25. In combination with a belt grinder having a transversely reciprocable carriage and a longitudinally reciprocable work table, a rock shaft on said carriage, a bed plate having an ear journaled on said rock shaft and frictionally engaged therewith, said table being slidable on said bed plate, an arm extending radially from said shaft, stops on said table positioned on each side of said arm to translate oscillating motion of said shaft to reciprocating motion of said table, a crank arm rotatably mounted on said shaft, a manually operable clutch for connecting said crank arm to said shaft, a pneumatically extensible member connected to said crank arm to impart oscillating motion to said shaft, depending members vertically adjustably secured to the sides of said table near the rear edge thereof and having locking bars on their lower edges, upstanding portions on said carriage having locking members engageable with said locking bars to prevent rotation of said table and bed plate with said shaft within the limits of oscillation of said piston, vertically adjustable stop means secured to said locking members and supporting the rear of said table, and a manual lever secured to said shaft arranged to rotate said shaft beyond the limits of movement of said piston to disengage said locking members and tilt said bed plate and work table.

HENRY J. KINGSBURY.

REFERENCES CITED

The following references are of record in the file of this patent:

UNITED STATES PATENTS

| Number | Name | Date |
|---|---|---|
| 282,293 | Fehn | July 31, 1883 |
| 572,812 | Longden | Dec. 8, 1896 |
| 737,220 | Godfrey | Aug. 25, 1903 |
| 998,351 | Kroeze | July 18, 1911 |
| 1,308,610 | Townsend | July 1, 1919 |
| 1,701,814 | Maddox | Feb. 12, 1929 |
| 1,841,411 | Kux | Jan. 19, 1932 |